United States Patent
Lee

(10) Patent No.: US 7,397,973 B2
(45) Date of Patent: Jul. 8, 2008

(54) METHOD FOR CONTROLLING INTERPOLATION DIRECTION AND RELATED DEVICE

(75) Inventor: Yuan-Chung Lee, Tai-Nan (TW)

(73) Assignee: MediaTek Inc., Hsin-Chu Hsien (TW)

( * ) Notice: Subject to any disclaimer, the term of this patent is extended or adjusted under 35 U.S.C. 154(b) by 779 days.

(21) Appl. No.: 10/708,375

(22) Filed: Feb. 27, 2004

(65) Prior Publication Data

US 2005/0190992 A1    Sep. 1, 2005

(51) Int. Cl.
G06K 9/32 (2006.01)
H04N 7/01 (2006.01)
H04N 11/20 (2006.01)

(52) U.S. Cl. .................. 382/300; 348/448

(58) Field of Classification Search ............ 382/300, 382/199, 298; 348/448, 222.1, 272, 452
See application file for complete search history.

(56) References Cited

U.S. PATENT DOCUMENTS

| | | | |
|---|---|---|---|
| 5,197,108 A | 3/1993 | Watanabe | |
| 5,742,348 A | 4/1998 | Kuwahara et al. | |
| 5,991,463 A * | 11/1999 | Greggain et al. | 382/298 |
| 6,133,957 A | 10/2000 | Campbell | |
| 6,229,578 B1 * | 5/2001 | Acharya et al. | 348/607 |
| 6,421,090 B1 * | 7/2002 | Jiang et al. | 348/452 |
| 6,507,364 B1 * | 1/2003 | Bishay et al. | 348/242 |
| 7,167,602 B2 * | 1/2007 | Yamashita et al. | 382/300 |
| 2002/0093587 A1 * | 7/2002 | Michel | 348/452 |
| 2003/0098925 A1 * | 5/2003 | Orlick | 348/448 |
| 2004/0233326 A1 * | 11/2004 | Yoo et al. | 348/452 |
| 2004/0246546 A1 * | 12/2004 | Minami et al. | 358/525 |
| 2005/0134730 A1 * | 6/2005 | Winger et al. | 348/448 |

OTHER PUBLICATIONS

T. Doyly, M. Looymans; Progressive Scan Conversion using Edge Information; Signal Processing of HDTV, II; p. 711-p. 721.

* cited by examiner

*Primary Examiner*—Samir A. Ahmed
*Assistant Examiner*—Nathan Bloom
(74) *Attorney, Agent, or Firm*—Winston Hsu

(57) ABSTRACT

The present invention provides a method for controlling an interpolation direction of a pixel needing to be interpolated between a first row and a second row within an image. The image has a plurality of pixels arranged in a matrix format. The method includes calculating a plurality of first horizontal pixel value differences between pixels positioned in the first row and a plurality of second horizontal pixel value differences between pixels positioned in the second row. The method further includes comparing the plurality of first horizontal pixel value differences with a first threshold and the plurality of second horizontal pixel value differences with a second threshold to control whether the interpolation direction is orthogonal to the first row and the second row.

22 Claims, 8 Drawing Sheets

METHOD FOR CONTROLLING INTERPOLATION DIRECTION AND RELATED DEVICE

BACKGROUND OF INVENTION

1. Field of the Invention

The present invention relates to a method and device capable of improving the accuracy of directional interpolation on object corners in an image, and more particularly, to a method and device for controlling an interpolation direction of a pixel needing to be interpolated.

2. Description of the Prior Art

Traditional interpolation methods assume that a two-dimensional image to be interpolated consists of a plurality of one-dimensional images, and therefore, the two-dimensional image is interpolated vertically or horizontally. Such treatment may introduce unwanted zigzag edges of objects in the image. Some directional interpolation methods have been proposed to solve the above-mentioned problem.

As shown in FIG. 1, the ELA algorithm (ref. T. Doyle and M. Looymans, Progressive scan conversion using edge information. In: L. Chiariglione, ed. Signal Processing of HDTV II, Elsevier Science Publishers B.V., North-Holland, pp. 711-721, 1990) is typical of the directional interpolation methods known in the art. Firstly, a direction corresponding to a pair of pixels having a minimum difference between their pixel values is selected from among three directions 131, 132, 133. The pixel values typically represent brightness (luminance) and/or color (chrominance) levels of each pixel. For example, if the pixels 111, 123 are similar and form a portion of an edge, the difference between the values of the pixels 111, 123 would be smaller than the difference between the values of pixels 112, 122 and smaller than the difference between the values of pixels 113, 121. Because of this, directional interpolation should be performed along the direction 131. That is, the interpolated pixel 152 is derived from averaging the values of the pixels 111, 123. As shown in FIG. 2, pixels 201, 202, 203 are interpolated vertically while pixels 211, 212, 213 are interpolated along an edge 215 of an object 210 of an interpolated image. The shading shown for each pixel in FIG. 2 denotes a hypothetical pixel value after interpolation. It is evident in this example that the zigzag edge problem is solved by using directional interpolation. For more information about variations of the ELA algorithm, please refer to U.S. Pat. No. 5,742,348 and U.S. Pat. No. 6,133,957.

However, the above-mentioned directional interpolation introduces a new problem of faulty treatment of object corners in the art. As shown in FIG. 3, pixels 301, 302, 303 are interpolated along improper directions 311, 312, 313, respectively. The pixels 301, 302, 303 that should represent a right-angle corner of an object 300 of an interpolated image are improperly interpolated. After interpolation, the above-mentioned right-angle corner substantially becomes a rounded corner. Similarly, the pixels 304, 305, 306 are also improperly interpolated.

SUMMARY OF INVENTION

It is therefore an objective of the present invention to provide a method and a related device for controlling an interpolation direction of a pixel needing to be interpolated to solve the above-mentioned problem. Another objective of the present invention is performing a cross-detection process during/after a directional interpolation process to improve the accuracy of the directional interpolation on object corners in an image.

The present invention provides a method for controlling an interpolation direction of a pixel needing to be interpolated between a first row and a second row within an image. The image has a plurality of pixels arranged in a matrix format. According to one embodiment, the method includes calculating a plurality of first horizontal pixel differences between pixels positioned in the first row and a plurality of second horizontal pixel differences between pixels positioned in the second row. The first and second horizontal pixel differences respectively correspond to opposite quadrants of the image with the pixel being an origin. The method further includes comparing the plurality of first horizontal pixel value differences with a first threshold and the plurality of second horizontal pixel value differences with a second threshold to control whether the interpolation direction is orthogonal to the first row and the second row.

The present invention further provides a device for controlling an interpolation direction of a pixel needing to be interpolated between a first row and a second row within an image. The image has a plurality of pixels arranged in a matrix format. According to the embodiment, the device includes an arithmetic unit for calculating a plurality of first horizontal pixel differences between pixels positioned in the first row and a plurality of second horizontal pixel differences between pixels positioned in the second row. The first and second horizontal pixel differences respectively correspond to opposite quadrants of the image with the pixel being an origin. The device further includes a processing unit electrically connected to the arithmetic unit for controlling the interpolation direction. The processing unit compares the plurality of first horizontal pixel value differences with a first threshold and the plurality of second horizontal pixel value differences with a second threshold to control whether the interpolation direction is orthogonal to the first row and the second row.

It is an advantage of the present invention method and device that the accuracy of the directional interpolation on object corners in the interpolated image is improved.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a method and device both for controlling an interpolation direction of a pixel needing to be interpolated between a first row and a second row within an image. The image has a plurality of pixels arranged in a matrix format, which is a two-dimensional array of pixels arranged in rows in the following embodiments. The method is capable of improving the accuracy of a directional interpolation process of the image, wherein an objective of the directional interpolation process is increasing the resolution of the image by generating a plurality of additional pixels. Please note that the interpolation process in the following embodiments can be based on the ELA algorithm, a variation of the ELA algorithm, or other directional interpolation algorithm as long as the implementation of the present invention will not be hindered. The present invention method is capable of generating the interpolation direction corresponding to the pixel according to the directional interpolation process. Another objective of the present invention is performing a cross-detection process during/after the directional interpolation process to improve the accuracy of the directional interpolation on object corners in the image.

Figure 4:
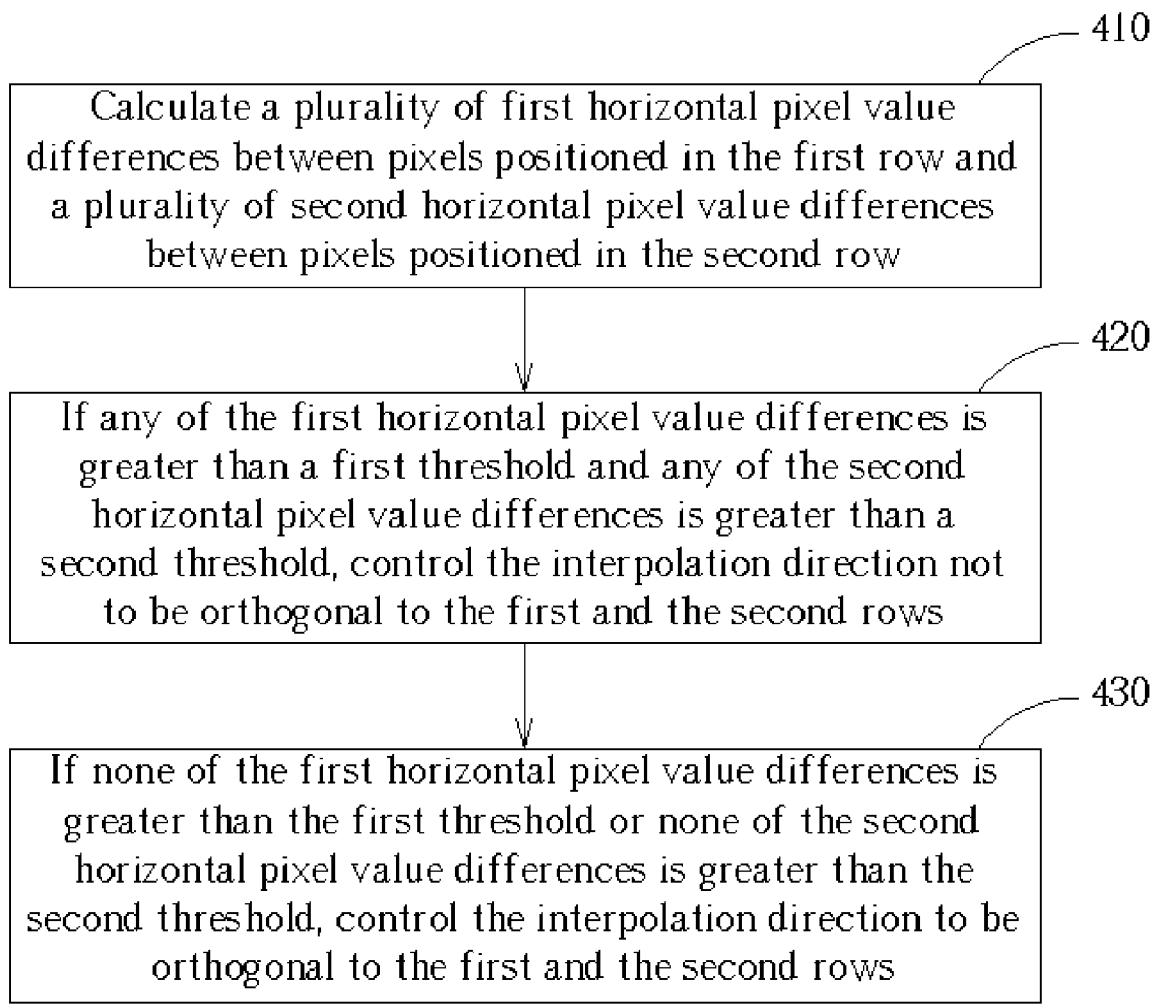
FIG. 4 is a flowchart illustrating steps of a method of pixel interpolation according to one embodiment of the present invention.
Figure 5:
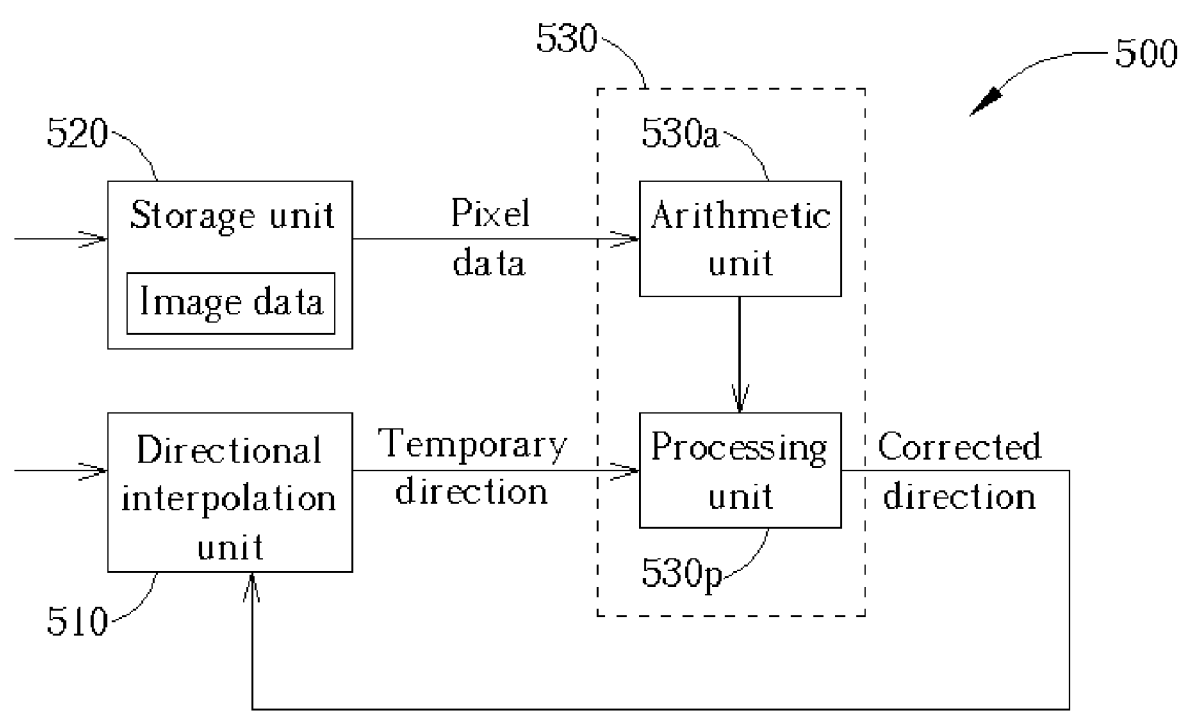
FIG. 5 is a block diagram of a video processing device according to the embodiment.
Figure 6:
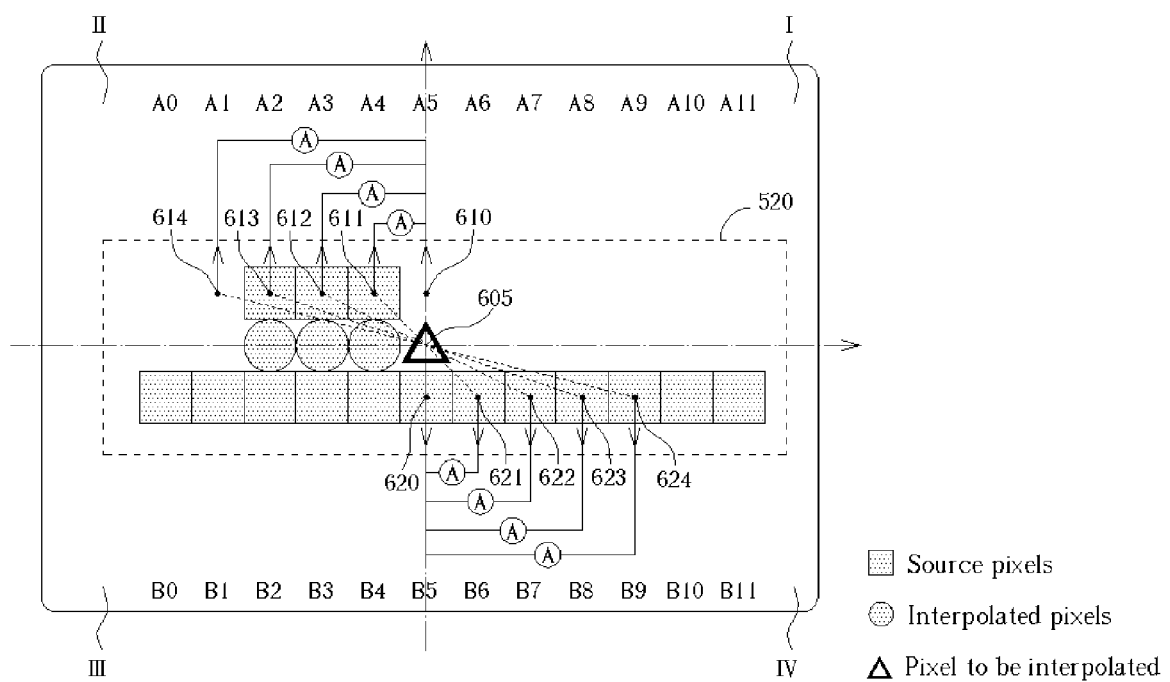
FIG. 6 is a first hypothetical representation of an arithmetic function applied to pixel data stored in a storage unit according to the embodiment.

Please refer to FIG. 4, FIG. 5, FIG. 6 at the same time. FIG. 4 is a flowchart illustrating steps of a method according to one embodiment of the present invention. FIG. 5 is a block diagram of a video processing device 500 for implementing the method shown in FIG. 4. The video processing device 500 includes a directional interpolation unit 510 for performing the directional interpolation process, a storage unit 520 for storing the data of the image, and a control device 530 having an arithmetic unit 530a and a processing unit 530p. Please note that the arithmetic unit 530a and the processing unit 530p can be integrated into one single module being the control device 530. Furthermore, the arithmetic unit 530a and/or the processing unit 530p can be installed in the directional interpolation unit 510. The directional interpolation unit 510 is capable of generating a temporary direction, and the control device 530 outputs a corrected direction according to the pixel data, a portion of the image data, and the inclination of the temporary direction. FIG. 6 is a hypothetical representation of an arithmetic function "A" applied to pixel data stored in the storage unit 520 according to the embodiment. The arithmetic function "A" is provided by the arithmetic unit 530a. In a first embodiment, the arithmetic function "A" calculates a horizontal pixel value difference between the values of two pixels as shown in FIG. 6. Of concern, the pixel values are typically values that represent the brightness (luminance) and/or color (chrominance) levels of each pixel. The method of the present invention is described as follows:

Step 410: Calculate a plurality of first horizontal pixel value differences |A5-A4|, |A5-A3|, |A5-A2|, |A5-A1|, . . . between pixels (610, 611), (610, 612), (610, 613), (610, 614), . . . positioned in the first row and a plurality of second horizontal pixel value differences |B5-B6|, |B5-B7|, |B5-B8|, |B5-B9|, . . . between pixels (620, 621), (620, 622), (620, 623), (620, 624), . . . positioned in the second row using the arithmetic unit 530a, wherein the first horizontal pixel value differences |A5-A4|, |A5-A3|, |A5-A2|, |A5-A1|, . . . and the second horizontal pixel value differences |B5-B6|, |B5-B7|, |B5-B8|, |B5-B9|, . . . correspond to opposite quadrants II, IV of the image, respectively, with pixel 605 being the origin. As defined in the arithmetic unit 530a and as shown in FIG. 6, the pixels 610, 611, 612, 613, 614, . . . and 620, 621, 622, 623, 624, . . . for deriving the plurality of horizontal pixel differences |A5-A4|, |A5-A3|, |A5-A2|, |A5-A1|, . . . and |B5-B6|, |B5-B7|, |B5-B8|, |B5-B9|, . . . with the arithmetic function "A" are selected from the image according to whether the temporary direction inclines to the left or to the right. For example, FIG. 6 illustrates the pixels applied with the arithmetic function "A" when the temporary direction inclines to the left.

Step 420: If any of the plurality of first horizontal pixel value differences |A5-A4|, |A5-A3|, |A5-A2|, |A5-A1|, . . . is greater than a first threshold T1, and any of the plurality of second horizontal pixel differences |B5-B6|, |B5-B7|, |B5-B8|, |B5-B9|, . . . is greater than a second threshold T2, control the interpolation direction not to be orthogonal to the first and the second rows using the processing unit 530p.

Step 430: If none of the first horizontal pixel differences |A5-A4|, |A5-A3|, |A5-A2|, |A5-A11|, . . . is greater than the first threshold T1 or none of the second horizontal pixel differences |B5-B6|, |B5-B7|, |B5-B8|, |B5-B9|, . . . is greater than the second threshold T2, control the interpolation direction to be orthogonal to the first and the second rows using the processing unit 530p.

Figure 1:
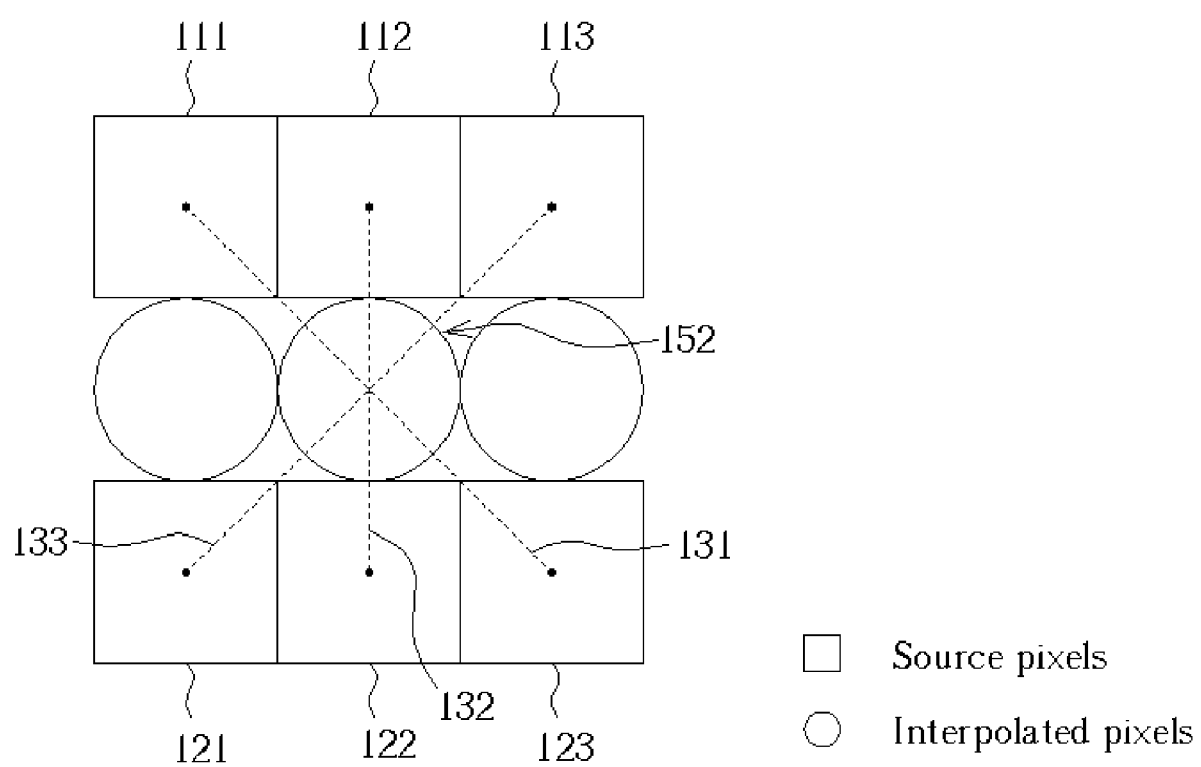
FIG. 1 is a hypothetical representation of a portion of an image interpolated by a directional interpolation method according to the prior art.
Figure 2:
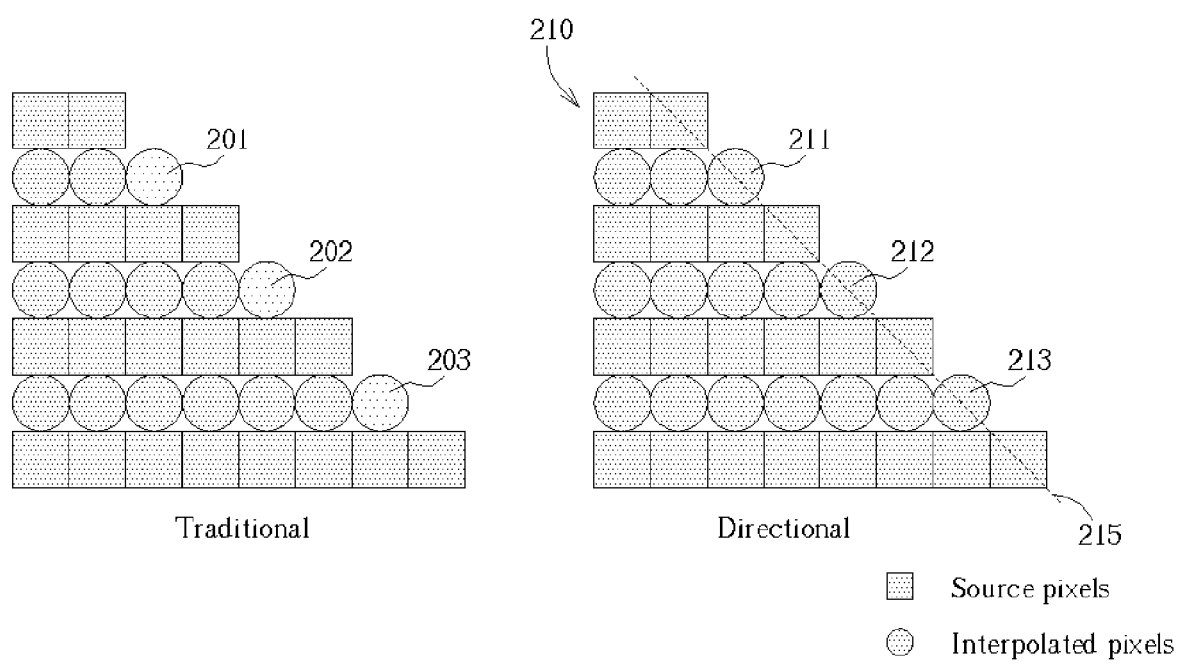
FIG. 2 is a hypothetical representation of a portion of an image interpolated by different interpolation methods according to the prior art.
Figure 3:
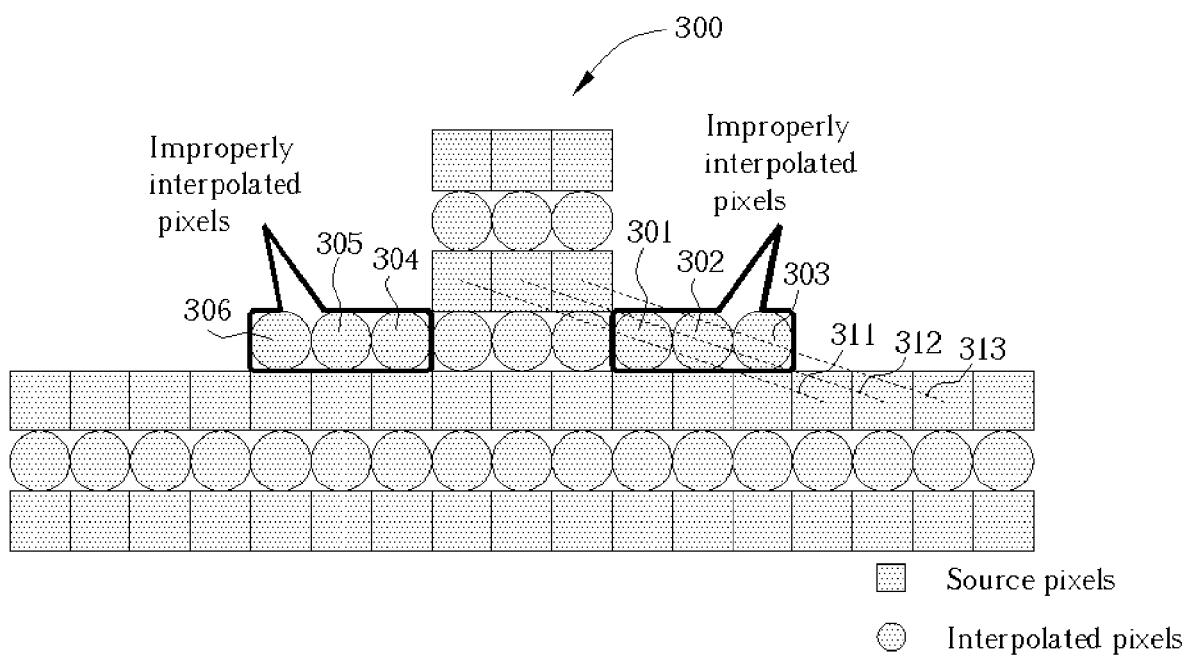
FIG. 3 is a hypothetical representation of a portion of an image interpolated by a directional interpolation method according to the prior art.

For simplicity, the first threshold T1 and the second threshold T2 can both be equivalent to a common threshold T. As shown in FIG. 6, the pixels shown with circles are interpolated pixels while the pixels shown with squares are source pixels of the directional interpolation performed by the directional interpolation unit 510. The shading shown for each pixel denotes a hypothetical pixel value after interpolation. The values of the pixels of the first row of the image are labeled as pixel values A0, A1, A2, A3, . . . A11 and the value of the pixels of a second row of the image are labeled as pixel values B0, B1, B2, B3, . . . B11. For example, the pixel values A1, A2, A3, A4, A5 correspond to the source pixels 614, 613, 612, 611, 610, respectively, and the pixel values B5, B6, B7, B8, B9 correspond to the source pixels 620, 621, 622, 623, 624, respectively. A pixel 605 being interpolated is shown with a triangle. As derived from the directional interpolation unit 510, according to the image shown in FIG. 6, the temporary direction inclines to the left. To prevent the faulty treatment of object corners described previously for the prior art illustration in FIG. 3, the arithmetic unit 530a is capable of calculating the horizontal pixel differences |A5-A4|, |A5-A3|, |A5-A2|, |A5-A1|, . . . and |B5-B6|, |B5-B7|, |B5-B8|, |B5-B9|, . . . according to the pixel data of the image. The processing unit 530p is capable of comparing one of the horizontal pixel value differences |A5-A4|, |A5-A3|, |A5-A2|, |A5-A1|, . . . and |B5-B6|, |B5-B7|, |B5-B8|, |B5-B9|, . . . calculated by the arithmetic unit 520 with the threshold T to determine if the temporary direction is correct. The threshold T can be defined according to experimental results or derived in advance from trial processes of various kinds of test images. If any of the horizontal pixel value differences |A5-A4|, |A5-A3|, |A5-A2|, |A5-A1|, . . . is greater than the threshold T and any of the horizontal pixel differences |B5-B6|, |B5-B7|, |B5-B8|, |B5-B9|, . . . is greater then the threshold T, the temporary direction, which represents that there is a leftward sloping edge, is correct. The pixel 605 being interpolated should accordingly be interpolated along the temporary direction. Otherwise, the temporary direction is incorrect, and the pixel 605 being interpolated should be interpolated in the vertical direction. As edges of different slops detected by the directional interpolation unit 510 vary, the amount of the horizontal pixel value differences for detecting the edges varies. That is to say, the selection of the pixels for deriving the horizontal pixel value differences can be implemented according to the range of the slops detected by the directional interpolation unit 510.

Supposing that the temporary direction inclines to the right, the present invention method and device according to the first embodiment operate similarly. If any of the horizontal pixel value differences |A5-A6|, |A5-A7|, |A5-A8|, |A5-A9|, . . . is greater than the threshold T and if any of the horizontal pixel value differences |B5-B4|, |B5-B3|, |B5-B2|, |B5-B1|, . . . is greater than the threshold T, the temporary direction, which represents that there is a rightward sloping edge, is correct. In this case, the pixel 605 being interpolated should accordingly be interpolated along the temporary direction. Otherwise, the temporary direction is incorrect, and the pixel 605 being interpolated should be interpolated in the vertical direction.

In the first embodiment, although Step 410 calculates the first horizontal pixel value differences |A5-A4|, |A5-A3|, |A5-A2|, |A5-A1|, . . . through a repeated use of pixel 610 with the other pixels 611, 612, 613, 614, . . . positioned in the first row and the second horizontal pixel differences |B5-B6|, |B5-B7|, |B5-B8|, |B5-B9|, . . . through a repeated use of pixel 620 with the other pixels 621, 622, 623, 624, . . . positioned in the second row, this is not a limitation of the present invention. The processing unit 530$p$ is capable of deriving various horizontal pixel value differences through the arithmetic unit 530$a$ to perform the comparison between one of the horizontal pixel value differences with a predetermined threshold such as the common threshold T.

Figure 7:
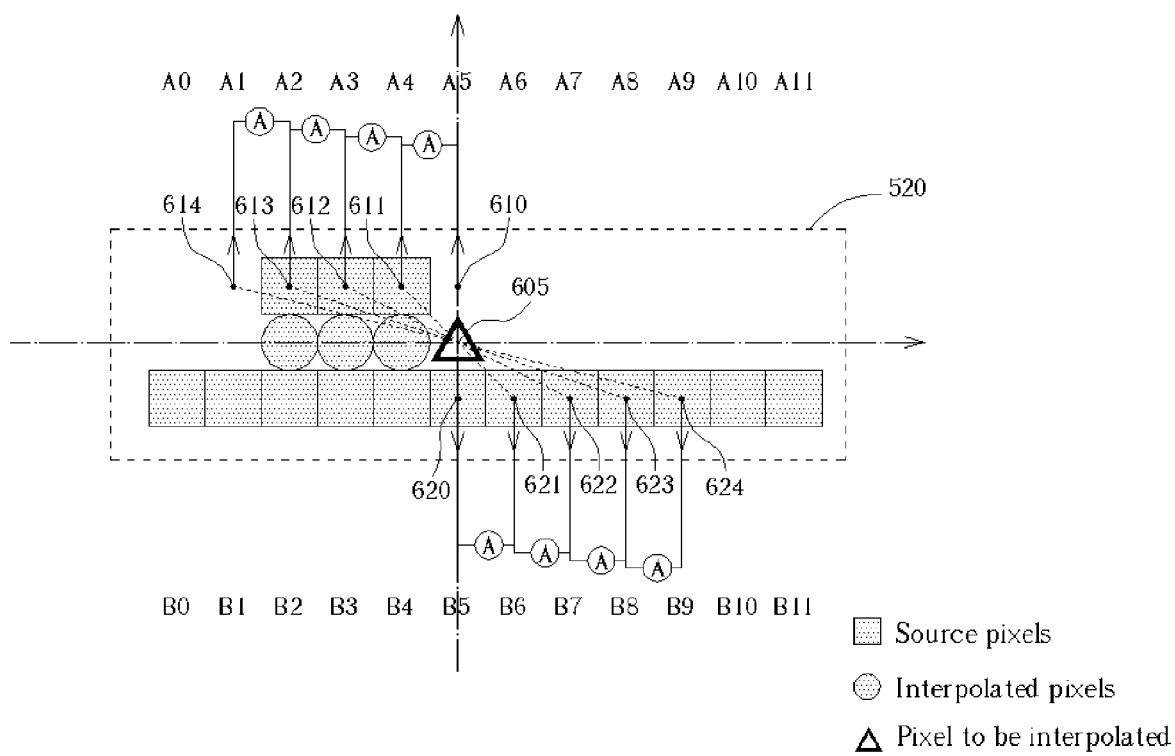
FIG. 7 is a second hypothetical representation of an arithmetic function applied to pixel data stored in a storage unit according to the embodiment.

A second embodiment shown in FIG. 7 is similar to the first embodiment shown in FIG. 6 with an exception of the selection of the pixels for deriving the horizontal pixel value differences. In the second embodiment of the present invention, Step 410 calculates each of the first horizontal pixel value differences |A5-A4|, |A4-A3|, |A3-A2|, |A2-A1|, . . . from adjacent pixels (610, 611), (611, 612), (612, 613), (613, 614), . . . and calculates each of the second horizontal pixel value differences |B5-B6|, |B6-B7|, |B7-B8|, |B8-B9|, . . . from adjacent pixels (620, 621), (621, 622), (622, 623), (623, 624), . . . In both embodiments, the plurality of pixels 610, 611, 612, 613, 614, . . . and 620, 621, 622, 623, 624, . . . selected for deriving the horizontal pixel value differences are located within two adjacent rows of the image. Additionally, the plurality of pixels 610, 611, 612, 613, 614, . . . and 620, 621, 622, 623, 624, . . . are located within two opposite quadrants II, IV of the image with the center of the two opposite quadrants II, IV being located at the pixel 605 being interpolated. Please note, the above-mentioned two adjacent rows are referring to the rows of the image prior to the interpolation being performed.

In another embodiment, a combination of the first and second embodiment, Step 410 calculates the first horizontal pixel value differences |A5-A4|, |A5-A3|, |A5-A2|, |A5-A1|, . . . through a repeated use of pixel 610 with the other pixels 611, 612, 613, 614, . . . positioned in the first row as in the first embodiment and calculates each of the second horizontal pixel differences |B5-B6|, |B6-B7|, |B7-B8|, |B8-B9|, . . . from adjacent pixels (620, 621), (621, 622), (622, 623), (623, 624), . . . .

Figure 8:
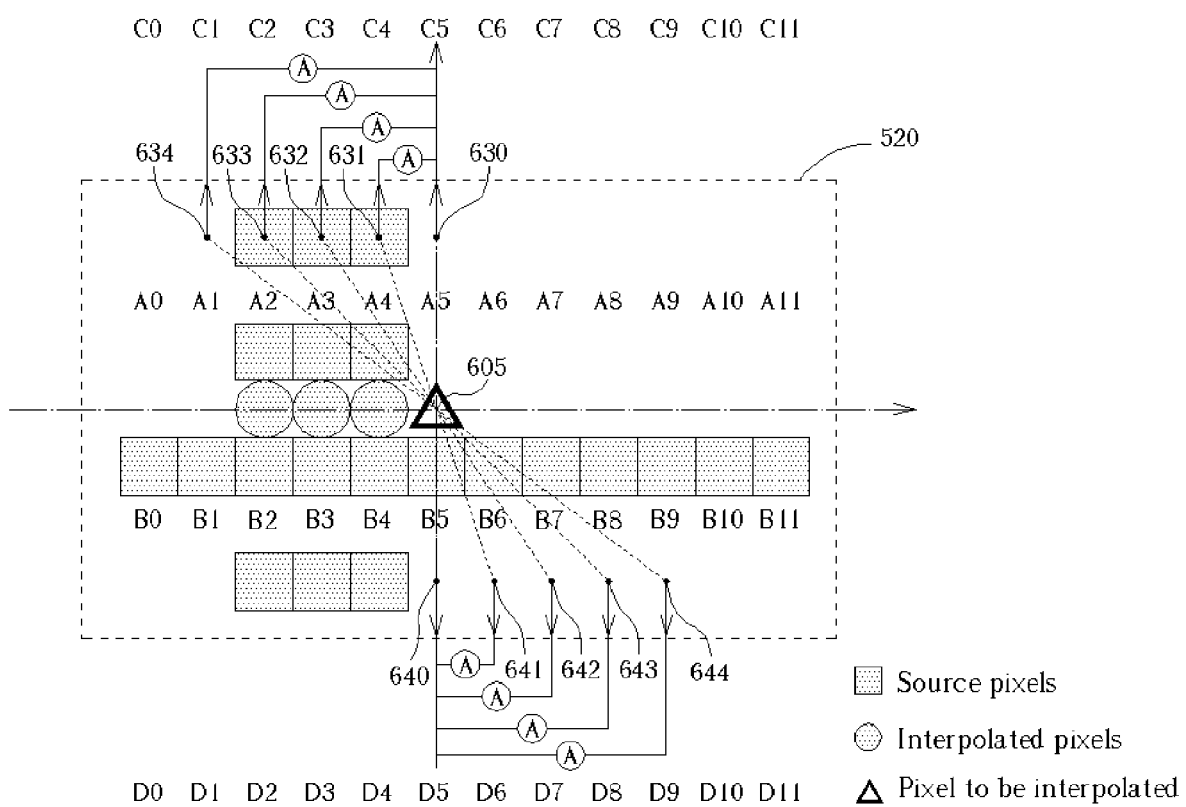
FIG. 8 is a third hypothetical representation of an arithmetic function applied to pixel data stored in a storage unit according to the embodiment.

A third embodiment shown in FIG. 8 is similar to the first embodiment shown in FIG. 6 with an exception that the third embodiment further considers pixel data C0, C1, C2, C3, . . . C11 of a third row of the image and pixel data D0, D1, D2, D3, . . . D11 of a fourth row of the image together with the pixel data A0, A1, A2, A3, . . . A11 and B0, B1, B2, B3, . . . B11 mentioned in the first embodiment. In the third embodiment, all the plurality of pixels 610, 611, 612, 613, 614, . . . , 620, 621, 622, 623, 624, . . . , 630, 631, 632, 633, 634, . . . and 640, 641, 642, 643, 644, . . . for deriving the horizontal pixel value differences |A5-A4|, |A5-A3|, |A5-A2|, |A5-A1|, . . . |B5-B6|, |B5-B7|, |B5-B8|, |B5-B9|, . . . , |C5-C4|, |C5-C3|, |C5-C2|, |C5-C1|, . . . , and |D5-D6|, |D5-D7|, |D5-D8|, |D5-D9|, . . . are located within four successive rows of the image. Please note, the above-mentioned four continuous rows are referring to the rows of the image prior to the interpolation being performed. According to the third embodiment, a revision of the related steps 410, 420, 430 are listed as follows.

Step 410: Calculate a plurality of first horizontal pixel value differences |A5-A4|, |A5-A3|, |A5-A2|, |A5-A1|, . . . between pixels (610, 611), (610, 612), (610, 613), (610, 614), . . . positioned in the first row; a plurality of second horizontal pixel value differences |B5-B6|, |B5-B7|, |B5-B8|, |B5-B9|, . . . between pixels (620, 621), (620, 622), (620, 623), (620, 624), . . . positioned in the second row; a plurality of third horizontal pixel value differences |C5-C4|, |C5-C3|, |C5-C2|, |C5-C1|, . . . between pixels (630, 631), (630, 632), (630, 633), (630, 634), . . . positioned in a third row; and a plurality of fourth horizontal pixel differences |D5-D6|, |D5-D7|, |D5-D8|, |D5-D9|, . . . between pixels (640, 641), (640, 642), (640, 643), (640, 644), . . . positioned in a fourth row. The calculations are performed using the arithmetic unit 530$a$, wherein the first horizontal pixel value differences |A5-A4|, |A5-A3|, |A5-A2|, |A5-A1|, . . . and the third horizontal pixel value differences |C5-C4|, |C5-C3|, |C5-C2|, |C5-C1|, . . . correspond to quadrant II of the image with the pixel 605 being the origin; and the second horizontal pixel value differences |B5-B6|, |B5-B7|, |B5-B8|, |B5-B9|, . . . and the fourth horizontal pixel value differences |D5-D6|, |D5-D7|, |D5-D8|, |D5-D9|, . . . correspond to the opposite quadrant IV of the image. Similarly, as defined in the arithmetic unit 530$a$ and as shown in FIG. 8 together with FIG. 6, the pixels 610, 611, 612, 613, 614, . . . and 620, 621, 622, 623, 624, . . . and 630, 631, 632, 633, 634, . . . and 640, 641, 642, 643, 644, . . . for deriving the plurality of horizontal pixel differences |A5-A4|, |A5-A3|, |A5-A2|, |A5-A1|, . . . and |B5-B6|, |B5-B7|, |B5-B8|, |B5-B9|, . . . and |C5-C4|, |C5-C3|, |C5-C2|, |C5-C1|, . . . and |D5-D6|, |D5-D7|, |D5-D8|, |D5-D9|, . . . with the arithmetic function "A" are selected from the image according to whether the temporary direction inclines to the left or to the right. For example, FIG. 8 together with FIG. 6 illustrate the pixels applied with the arithmetic function "A" when the temporary direction inclines to the left.

Step 420: If any of the plurality of first horizontal pixel value differences |A5-A4|, |A5-A3|, |A5-A2|, |A5-A1|, . . . is greater than a first threshold T1, and any of the plurality of second horizontal pixel value differences |B5-B6|, |B5-B7|, |B5-B8|, |B5-B9|, . . . is greater than a second threshold T2, and any of the plurality of third horizontal pixel value differences |C5-C4|, |C5-C3|, |C5-C2|, |C5-C1|, . . . is greater than a third threshold T3, and any of the plurality of the fourth horizontal pixel differences |D5-D6|, |D5-D7|, |D5-D8|, |D5-D9|, . . . is greater than a fourth threshold T4, control the interpolation direction not to be orthogonal to the first, second, third, and fourth rows using the processing unit 530$p$.

Step 430: If none of the first horizontal pixel value differences |A5-A4|, |A5-A3|, |A5-A2|, |A5-A1|, . . . is greater than the first threshold T1, or none of the second horizontal pixel value differences |B5-B6|, |B5-B7|, |B5-B8|, |B5-B9|, . . . is greater than the second threshold T2, or none of the third horizontal pixel value differences |C5-C4|, |C5-C3|, |C5-C2|, |C5-C1|, . . . is greater than the third threshold T3, or none of the fourth horizontal pixel value differences |D5-D6|, |D5-D7|, |D5-D8|, |D5-D9|, . . . is greater than the fourth threshold T4, control the interpolation direction to be orthogonal to the first, second, third, and fourth rows using the processing unit 530p.

In order to reduce calculation complexity of the present invention method and device, the calculations and the comparisons relating to some of the plurality of horizontal pixel differences |A5-A4|, |A5-A3|, |A5-A2|, |A5-A1|, . . . and |B5-B6|, |B5-B7|, |B5-B8|, |B5-B9|, . . . and |C5-C4|, |C5-C3|, |C5-C2|, |C5-C1|, . . . and |D5-D6|, |D5-D7|, |D5-D8|, |D5-D9|, . . . can be omitted. In the fourth embodiment of the present invention, only the horizontal pixel differences |A5-A4|, |A5-A2|, . . . and |B5-B6|, |B5-B8|, . . . and |C5-C4|, |C5-C2|, . . . and |D5-D6|, |D5-D8|, . . . are considered. In the fifth embodiment of the present invention, only the horizontal pixel differences |A5-A4|, |A5-A2|, . . . and |B5-B6|, |B5-B8|, . . . and |C5-C3|, |C5-C1|, . . . and |D5-D7|, |D5-D9|, . . . are considered. In other variations of the present invention, simplified calculation of the plurality of horizontal pixel differences may be applied.

The method and the device of the present invention can detect improper interpolation directions generated by the directional interpolation unit so the present invention method and device improve the accuracy of the directional interpolation on object corners in the interpolated image.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for controlling an interpolation direction of a pixel needing to be interpolated between a first row and a second row within an image, the image having a plurality of pixels arranged in a matrix format, the method conlprising:

(a) calculating a plurality of first horizontal pixel value differences between pixels positioned in the first row and calculating, a plurality of second horizontal pixel value differences bctween pixels positioned in the second row, wherein the first horizontal pixel value differences correspond to a first quadrant of the image with the pixel needing to be interpolated being an origin, the second horizontal pixel value differences correspond to a second quadrant of the image with the pixel needing to be interpolated being the origin, and the first quadrant is opposite to the second quadrant; and (b) comparing the plurality of first horizontal pixel value differences with a first threshold and the plurality of second horizontal pixel value differences with a second threshold to control whether the interpolation direction is orthogonal to the first row and the second row.

2. The method of claim 1, wherein step (b) controls whether the interpolation direction is orthogonal to the first rowr and the second row according to at least one of the following steps (b-1), (b-2), and (b-3):

(b-1) if any of the plurality of first horizontal pixel value differences is greater than the first threshold and any of the plurality of second horizontal pixel value differences is greater than the second threshold, controlling the interpolation direction not to be orthogonal to the first and the second rows, otherwise, controlling the intespolation direction to be orthogonal to the first and the second rows;

(b-2) if none of the plurality of first horizontal pixel value differences is greater than the first threshold or none of the plurality of second horizontal pixel value differences is greater than the second threshold, controlling the intcrpolation dircction to be orthogonal to the first and the second rows, othenvisc, controlling the interpolation direction not to be orthogonal to the first and the second rows; and (b-3) if any of the plurality of first horizontal pixel value differences is greater than the first threshold and any of the plurality of second horizontal pixel value differences is greater than the second threshold, controlling the interpolation direction not to be orthogonal to the first and the second rows, and if none of the plurality of first horizontal pixcl value differences is greater than the first threshold or none of the plurality of second horizontal pixel value differences is greater than the second threshold, controlling the interpolation direction to be orthogonal to the first and the second rows.

3. The method of claim 1, further comprising:

(c) generating the interpolation direction corresponding to the pixel needing to be interpolated according to a directional intcrpolation process.

4. The method of claim 1, wherein the first threshold is equal to the second threshold.

5. The method of claim 1, wherein the first row is adjacent to the second row.

6. The method of claim 5, wherein:

step (a) further comprises calculating a plurality of third horizontal pixel value differences between pixels positioned in a third row and calculating a plurality of fourth horizontal pixel value differences behveen pixels positioned in a fourth row, wherein the third horizontal pixel value differences correspond to the first quadrant of the imagc with the pixel needing to be interpolated being the origin, and the fourth horizontal pixel value differences correspond to the second quadrant of the image with the pixel needing to be interpolated being the origin; and step (b) further comprises comparing the plurality of third horizontal pixel value differences with a third threshold and the plurality of fourth horizontal pixel value differences with a fourth threshold to control whether the interpolation direction is orthogonal to the first, second, third, and fourth rows.

7. The method of claim 6, wherein the first and second rows are positioned between the third and fourth rows.

8. The method of claim 7, wherein the first, second, third, and fourth rows correspond to four successive rows.

9. The method of claim 1, wherein:

step (a) further comprises calculating a plurality of third horizontal pixel value differences between pixels positioned in a third row and calculating a plurality of fourth horizontal pixel value differences between pixels positioned in a fourth row, wherein the third horizontal pixel value differences correspond to the first quadrant of the image with the pixel needing to be interpolated being the origin, and the fourth horizontal pixel value differences correspond to the second quadrant of the image with the pixel needing to be interpolated being the origin; and step (b) further comprises comparing the plurality of third horizontal pixel value differences with a third threshold and the plurality of fourth horizontal pixel value differences with a fourth threshold to control whether the interpolation direction is orthogonal to the first, second, third, and fourth rows.

10. The method of claim 1, wherein step (a) calculates the first horizontal pixel value differences through a repeated use of pixel with other pixels positioned in the first row.

11. The method of claim 1, wherein step (a) calculates the second horizontal pixel value differences through a repeated use of pixel with other pixels positioned at the second row.

12. The method of claim 1, wherein step (a) calculates each of the second horizontal pixel value differences from adjacent pixels.

13. The method of claim 1, wherein step (a) calculates each of the first horizontal pixel value differences from adjacent pixels, and calculates each of the second horizontal pixel value differences from adjacent pixels.

14. A device for controlling an interpolation direction of a pixel needing to be interpolated between a first row and a second row within an image, the image having a plurality of pixels arranged in a matrix format, the device comprising:
an arithmetic unit for calculating a plurality of first horizontal pixel value differences between pixels positioned in the first row and calculating a plurality of second horizontal pixel value differences between pixels positioned in the second row; wherein the first horizontal pixel value differences correspond to a first quadrant of the image with the pixel needing to be interpolated being an origin, the second horizontal pixel value differences correspond to a second quadrant of the image with the pixel needing to be interpolated being the origin, and the first quadrant is opposite to the second quadrant; and
a processing unit electrically connected to the arithmetic unit for controlling the interpolation direction, the processing unit comparing the plurality of first horizontal pixel value differences with a first threshold and the plurality of second horizontal pixel value differences with a second threshold to control whether the interpolation direction is orthogonal to the first row and the second row.

15. The device of claim 14, wherein the processing unit controls whether the interpolation direction is orthogonal to the first row and the second row according to at least one of the following steps (a-1), (a-2), and (a-3):
(a-1) if any of the plurality of first horizontal pixel value differences is greater than the first threshold and any of the plurality of second horizontal pixel value differences is greater than the second threshold, controlling the interpolation direction not to be orthogonal to the first and the second rows, otherwise, controlling the interpolation direction to be orthogonal to the first and the second rows;
(a-2) if none of the plurality of first horizontal pixel value differences is greater than the first threshold or none of the plurality of second horizontal pixel value differences is greater than the second threshold, controlling the interpolation direction to be orthogonal to the first and the second rows, otherwise, controlling the interpolation direction not to be orthogonal to the first and the second rows; and
(a-3) if any of the plurality of first horizontal pixel value differences is greater than the first threshold and any of the plurality of second horizontal pixel value differences is greater than the second threshold, controlling the interpolation direction not to be orthogonal to the first and the second rows, and if none of the plurality of first horizontal pixel value differences is greater than the first threshold or none of the plurality of second horizontal pixel value differences is greater than the second threshold, controlling the interpolation direction to be orthogonal to the first and the second rows.

16. The device of claim 14, wherein the device is electrically coupled to a directional interpolation unit, and the processing unit generates the interpolation direction corresponding to the pixel needing to be interpolated according to a temporary direction generated by the directional interpolation unit.

17. The device of claim 16, wherein the arithmetic unit and/or the processing unit are installed in the directional interpolation unit.

18. The device of claim 14, wherein the arithmetic unit and the processing unit are integrated into one module.

19. The device of claim 14, wherein:
the arithmetic unit is capable of calculating a plurality of third horizontal pixel value differences between pixels positioned in a third row and calculating a plurality of fourth horizontal pixel value differences between pixels positioned in a fourth row, wherein the third horizontal pixel value differences correspond to the first quadrant of the image with the pixel needing to be interpolated being the origin, and the fourth horizontal pixel value differences correspond to the second quadrant of the image with the pixel needing to be interpolated being the origin; and
the processing unit is capable of comparing the plurality of third horizontal pixel value differences with a third threshold and the plurality of fourth horizontal pixel value differences with a fourth threshold to control whether the interpolation direction is orthogonal to the first, second, third, and fourth rows.

20. A method for determining an interpolation direction of a designated pixel located between a first row of horizontal pixels and a second row of horizontal pixels within an image, the method comprising:
(a) obtaining first values representing differences between pairs of at least some of the first row of horizontal pixels, and obtaining second values representing differences between pairs of at least some of the second row of horizontal pixels; and
(b) comparing the first values with a first threshold and the second values with a second threshold to determine whether the interpolation direction is orthogonal to the first row and the second row.

21. The method of claim 20, wherein the first values are obtained by calculating luminance or chrominance values of the first and second rows of horizontal pixels.

22. The method of claim 20, wherein step (b) determine whether the interpolation direction is orthogonal to the first row and the second row according to at least one of the following steps (b-1), (b-2), and (b-3):
(b-1) if any of the first values is greater than the first threshold and any of the second values is greater than the second threshold, controlling the interpolation direction not to be orthogonal to the first and the second rows, otherwise, controlling the interpolation direction to be orthogonal to the first and the second rows;
(b-2) if none of the first values is greater than the first threshold or none of the second values is greater than the second threshold, controlling the interpolation direction to be orthogonal to the first and the second rows, otherwise, controlling the interpolation direction not to be orthogonal to the first and the second rows; and
(b-3) if any of the first values is greater than the first threshold and any of the second values is greater than the second threshold, controlling the interpolation direction not to be orthogonal to the first and the second rows, and if none of the first values is greater than the first threshold or none of the second values is greater than the second threshold, controlling the interpolation direction to be orthogonal to the first and the second rows.

* * * * *